(12) United States Patent
Edgar,

(10) Patent No.: X9867
(45) Date of Patent: Jul. 2, 1836

(54) STEAM ENGIN, LOCOMOTIVE, & RAILROADS

(76) Inventor: Issac W. Edgar

United States Patent
Patent No.: X9867
Sheet 1. 2 Sheets.
I. W. Edgar.
Inclined Railroad.
Patented Jul. 2. 1836.
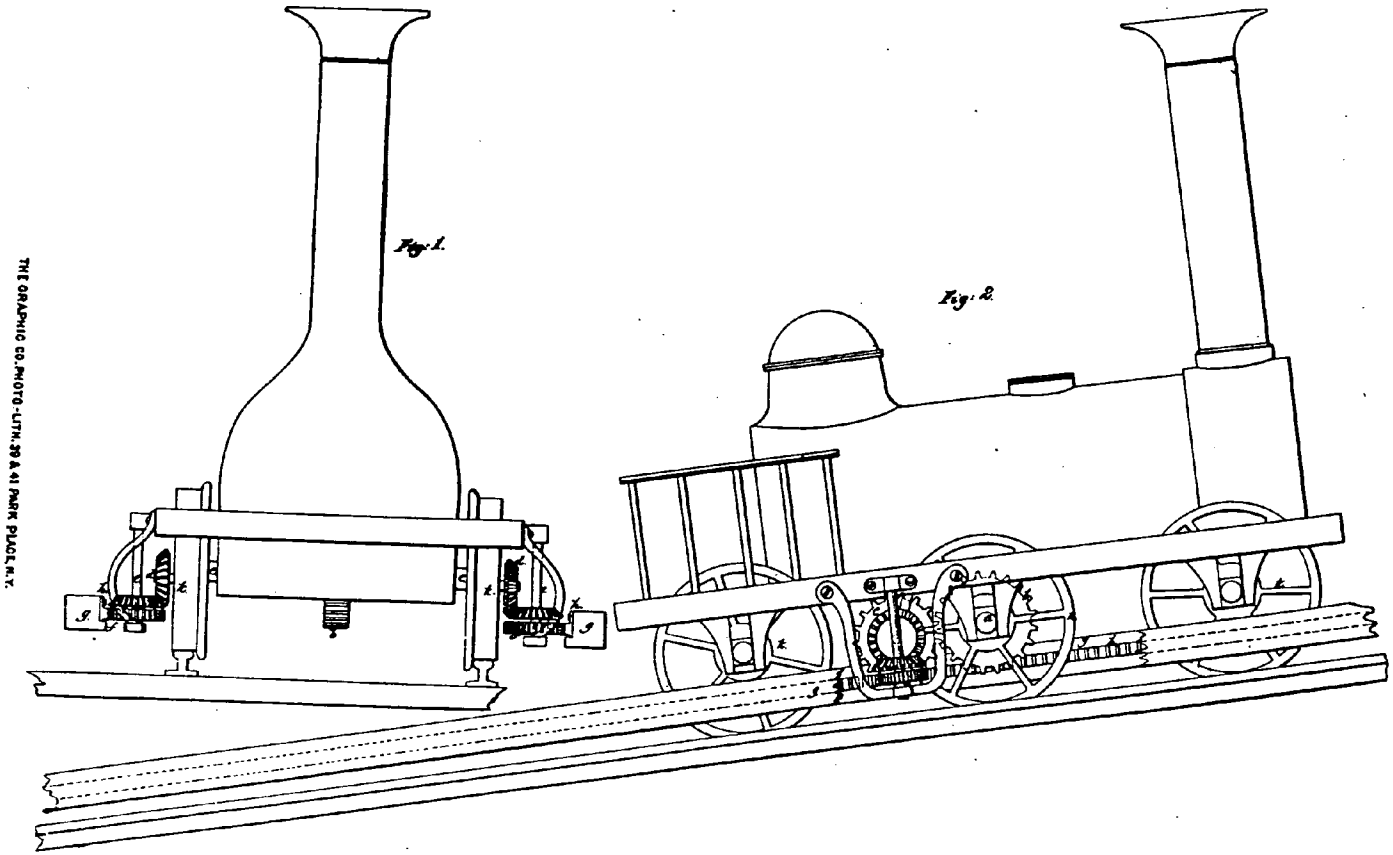
THE GRAPHIC CO. PHOTO-LITH. 39 & 41 PARK PLACE, N.Y.

United States Patent
Patent No.: X9867
Sheet 2, 2 Sheets.
I. W. Edgar.
Inclined Railroad.
9867X
Patented Jul. 2, 1836.
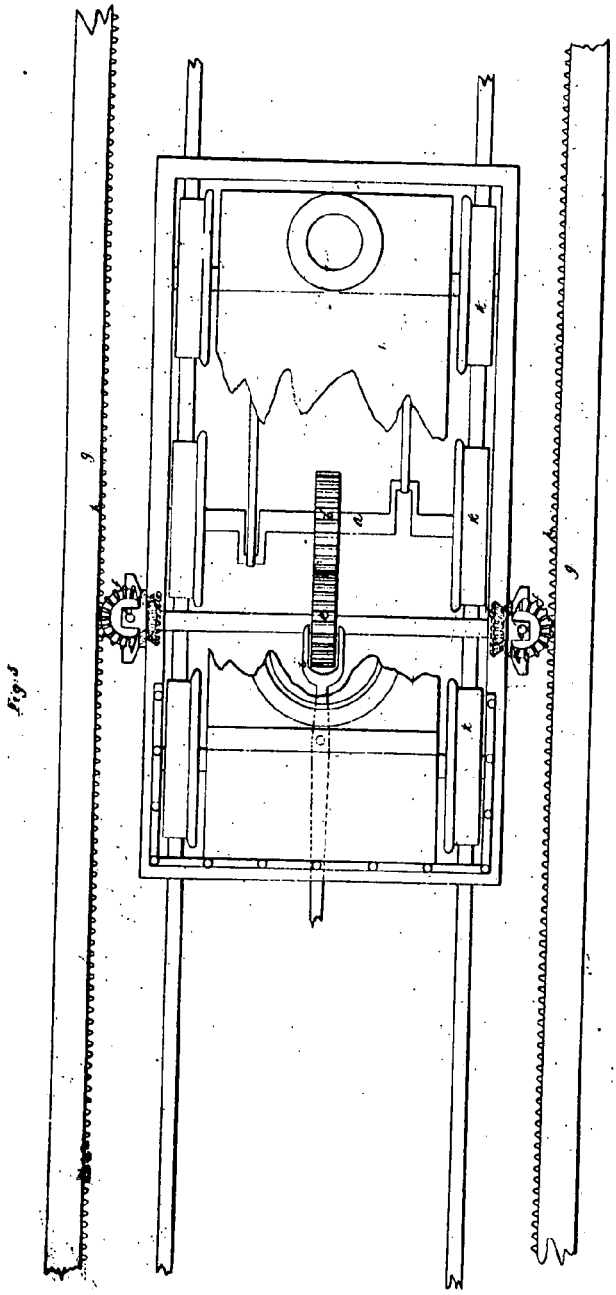

United States Patent
Patent No.: X9867
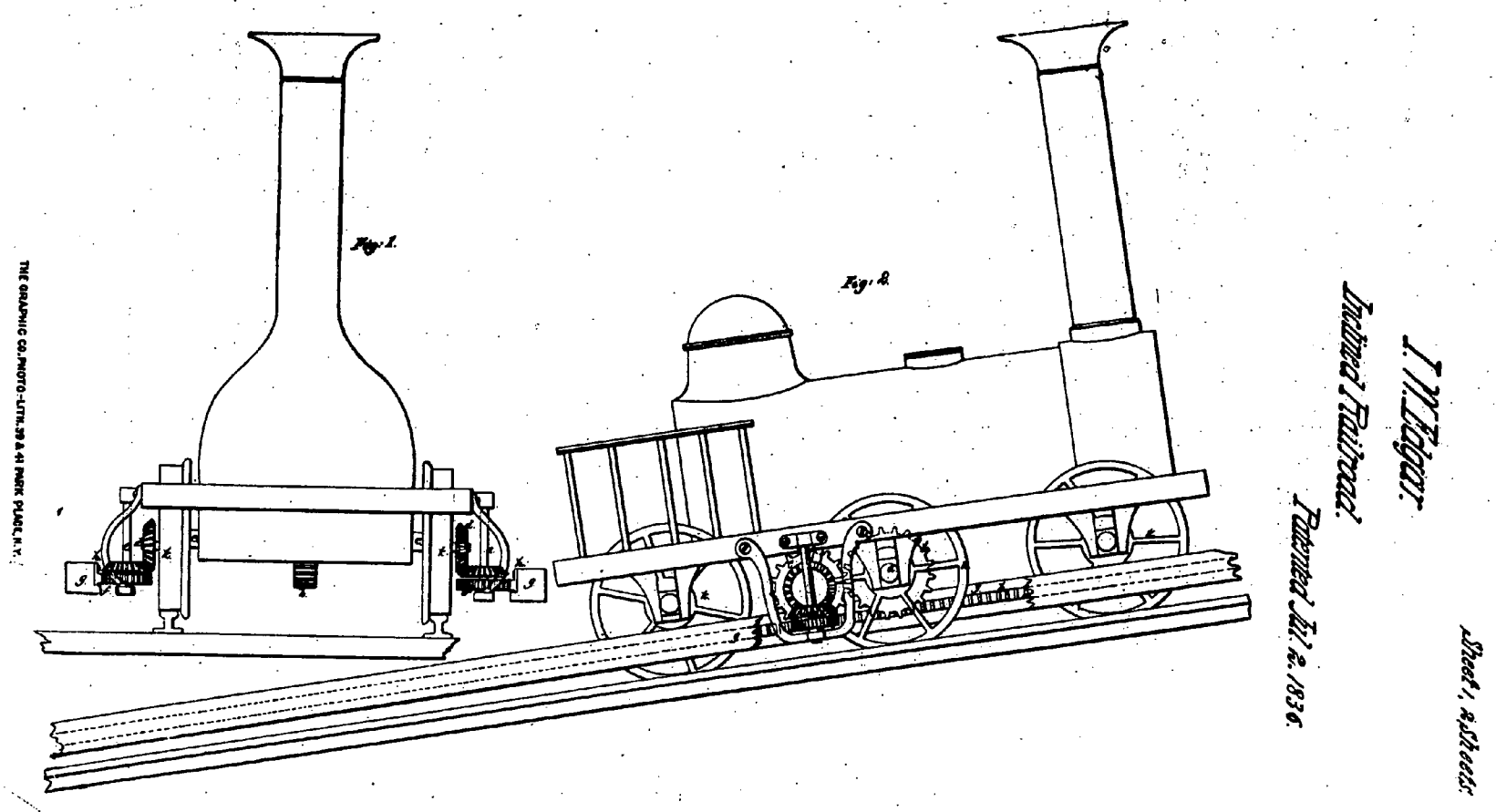

United States Patent
Patent No.: X9867
Sheet 2, 2 Sheets
J. M. Edgar.
Inclined Railroad.
Patented Jul. 2, 1836.
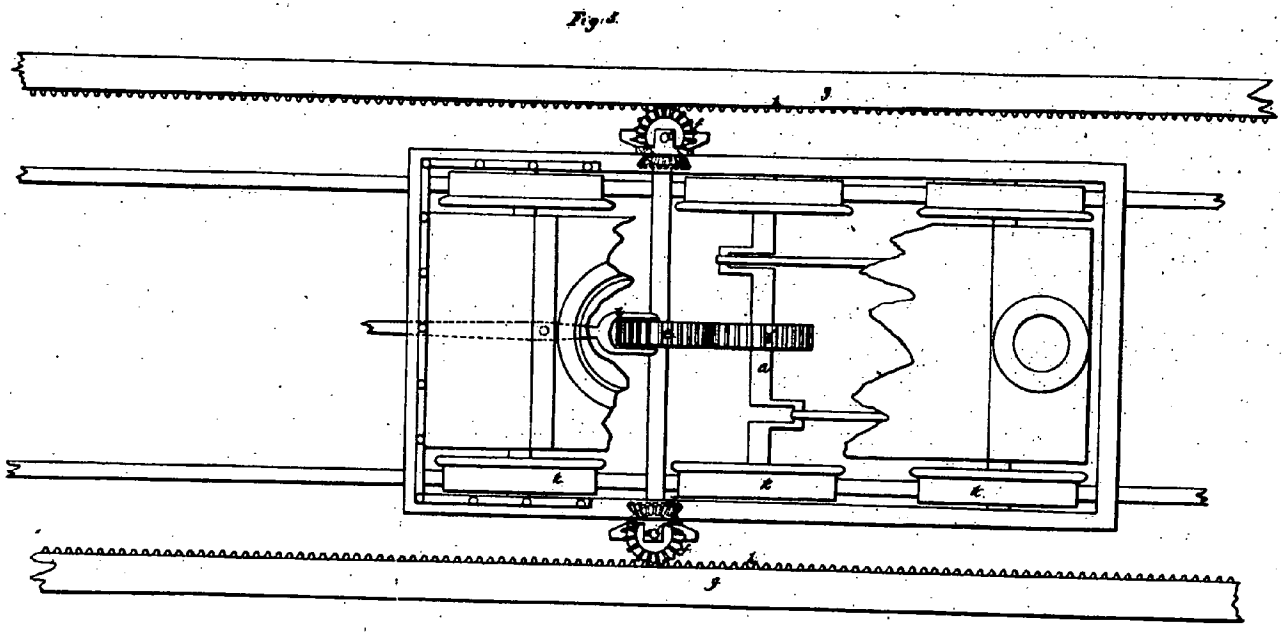
THE GRAPHIC CO: PHOTO-LITH. 39 & 41 PARK PLACE, N.Y.